A. H. MILLER.
ANTIFRICTION BEARING AND METHOD OF ASSEMBLING THE SAME.
APPLICATION FILED DEC. 19, 1916.

1,247,858.

Patented Nov. 27, 1917.

INVENTOR
Alfred H. Miller
BY J. Wm. Ellis
ATTORNEY

UNITED STATES PATENT OFFICE.

ALFRED H. MILLER, OF PHILADELPHIA, PENNSYLVANIA.

ANTIFRICTION-BEARING AND METHOD OF ASSEMBLING THE SAME.

1,247,858.   Specification of Letters Patent.   Patented Nov. 27, 1917.

Application filed December 19, 1916. Serial No. 137,840.

*To all whom it may concern:*

Be it known that I, ALFRED H. MILLER, a citizen of the United States of America, and a resident of the city of Philadelphia, county of Philadelphia, and State of Pennsylvania, have invented certain new and useful Improvements in Antifriction-Bearings and Methods of Assembling the Same, of which the following is a full, clear, and exact description.

My invention relates generally to antifriction bearings, and more particularly to a bearing of the type wherein tapered rollers, having their peripheries in contact, are employed.

The general object of my invention has been to provide a bearing of this type which shall have a minimum number of parts and thus be very cheap to manufacture and one which cannot easily get out of order.

Another object has been to provide a bearing in which the retaining pins and all loose or attached retaining rings on the cones shall be dispensed with.

Furthermore, I have provided in connection with this bearing a method of making the same so that it may be quickly assembled and after being assembled shall be locked together so that it cannot come apart or be taken apart.

The above objects and advantages have been accomplished by the device shown in the accompanying drawings.

In the drawings:—

Figure 1:
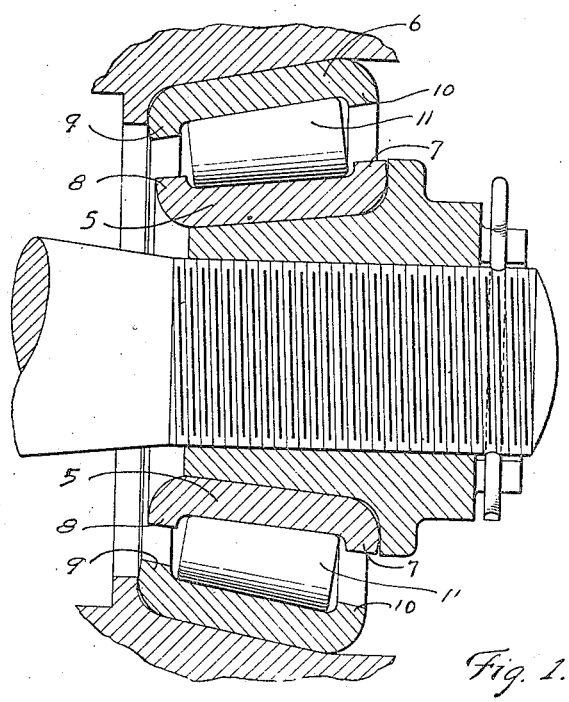
Figure 1 is a sectional elevation of my bearing taken on the center line thereof.

In the drawings, 5 is the inner bearing cone and 6 the outer bearing cone. These cones are preferably formed of pressed steel, thus dispensing with all expensive machining operations. The inner cone 5 is upturned at each end thereof, providing retainer shoulders 7 and 8. The outer bearing cone 6 is inturned at its edges so as to form retainer shoulders 9 and 10. 11 are the tapered rollers of my bearing, which are provided with smooth ends.

Figure 2:
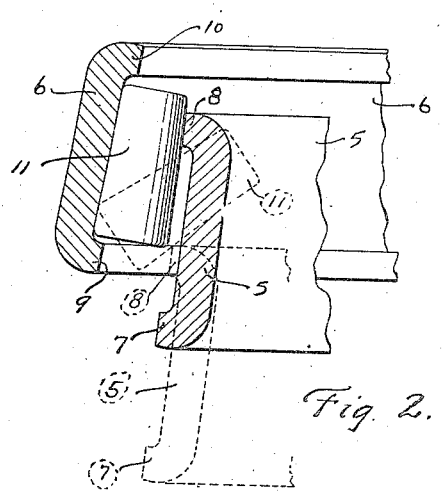
Fig. 2 is a fragmentary view showing my method of assembling my bearing.

In assembling my bearing a springing action of the rollers and cones is employed and therefore it is necessary that the diameters of the retainer shoulders be very exact, especially the retainer shoulder 8 of the inner bearing cone 5. This shoulder is given an outside diameter slightly larger than the diameter of a circle drawn tangent to the peripheries of the smaller ends of the rollers 11 when assembled within the outer bearing cone, as shown in Fig. 2.

When my bearing is to be assembled, the following method is employed: The cones are arranged horizontally with the inner cone 5 occupying the position, relative to the outer cone 6 which is indicated by the dotted lines in Fig. 2. When the cones are in these relative positions, the rollers are placed within the outer cone 6 as shown by the dotted lines in Fig. 2. When all of the rollers have been put into place the upper cone 6 is lowered until the parts assume the positions shown by the full lines in Fig. 2. The relative size of the parts prevent the outer cone and rollers from moving downwardly farther than substantially the positions shown in Fig. 2. When in these positions, the outer cone 6 and the rollers 11 may be forced downwardly and into their final and working positions by giving the outer cone a rotary motion together with a downward pressure. This rotary motion and pressure cause the parts to spring sufficiently so as to permit the bearing to be assembled. The difference in size is so slight that this spring is insufficient to distort the members and the same will assume their normal conditions just as soon as the bearing parts are in their final positions. When the bearing is once in position, it is impossible for the parts to become disengaged or for the same to be taken apart. The difference in the normal diameters of the parts is very slight and it is necessary for each of the rollers to be in exactly the same position as when assembled if it is to be taken apart. This is a practical impossibility.

Obviously, if desired, some modification of the details herein shown and described may be made without departing from the spirit of my invention or the scope of the appended claims and I do not, therefore, wish to be limited to the exact embodiment herein shown and described.

Having thus described my invention, what I claim is:

1. An antifriction bearing comprising an inner bearing cone having each of its ends upturned, an outer bearing cone having each of its ends inturned, said bearing cones being of uniform thickness, and a full series of tapered rollers disposed between said cones.

2. An antifriction bearing comprising an inner bearing cone and an outer bearing cone, each of said cones being provided at each end with an integral retainer shoulder, and a full series of tapered rollers disposed between said cones.

3. An antifriction bearing comprising an inner bearing cone and an outer bearing cone, each of said cones being provided with retainer shoulders, and a full series of tapered rollers disposed between said cones, the smaller retainer shoulders of said inner cone being slightly larger in diameter than the diameter of a circle drawn tangent to the peripheries of the smaller ends of said rollers when in position in said outer cone, whereby the parts of the bearing may be sprung into their working position.

4. A method of assembling an antifriction bearing, having an inner cone with its smaller end out-turned, and an outer cone with its larger end inturned comprising the placing of the inner and the outer bearing cones in a horizontal position so that the outer cone overlaps the inner cone, then placing the rollers between the cones and within the outer cone, then moving the cones toward each other, and then giving to one of said cones a rotation relative to the other and a pressure toward the other whereby the parts are sprung together into their proper working position.

In testimony whereof, I have hereunto signed my name.

ALFRED H. MILLER.